Dec. 10, 1940.   S. L. WENTZ   2,224,560
EYESHADE MEANS
Filed Jan. 12, 1939   3 Sheets-Sheet 1

INVENTOR.
Samuel L. Wentz,
BY George D. Richards
ATTORNEY.

Dec. 10, 1940.  S. L. WENTZ  2,224,560
EYESHADE MEANS
Filed Jan. 12, 1939  3 Sheets-Sheet 2
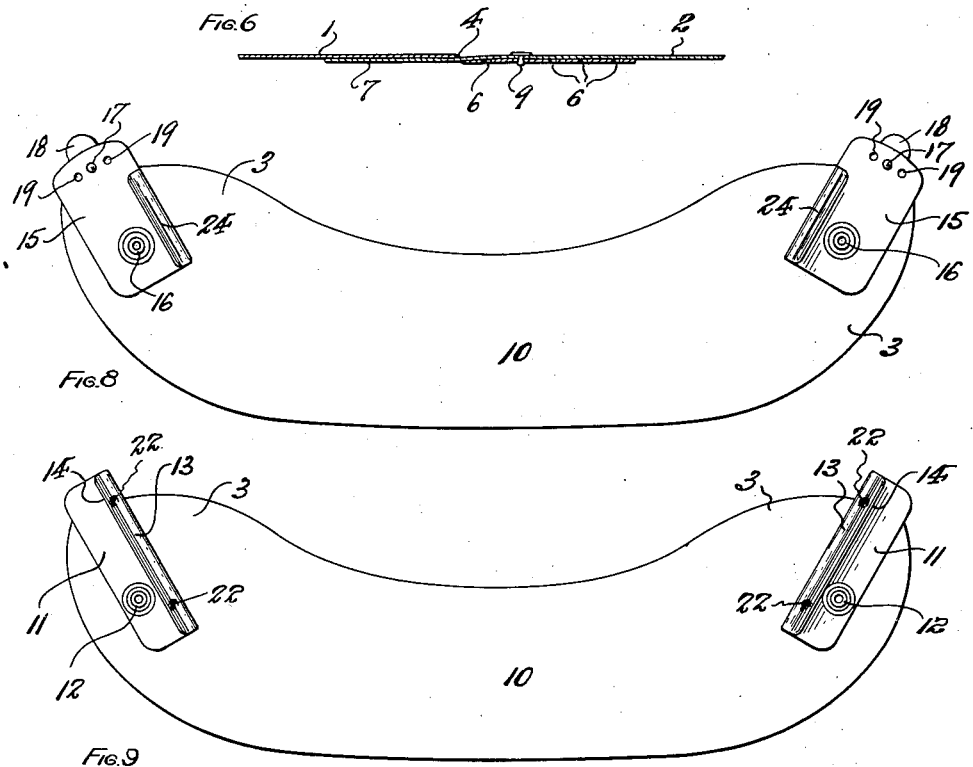
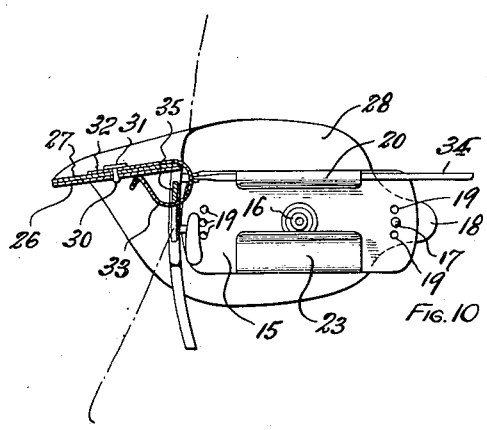
INVENTOR.
Samuel L. Wentz,
BY
ATTORNEY.

Dec. 10, 1940.    S. L. WENTZ    2,224,560
EYESHADE MEANS
Filed Jan. 12, 1939    3 Sheets-Sheet 3
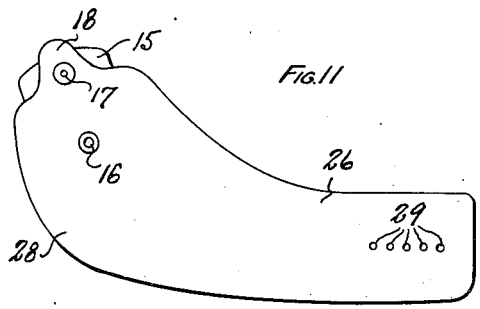
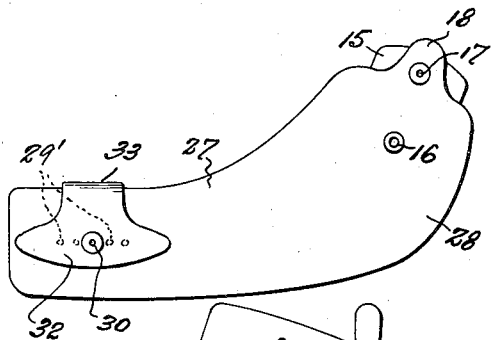
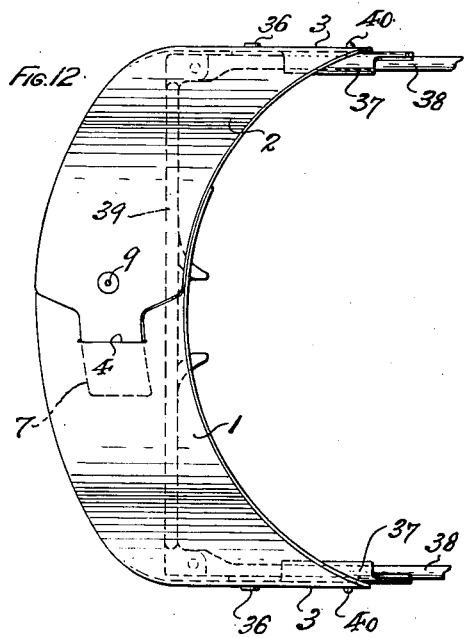
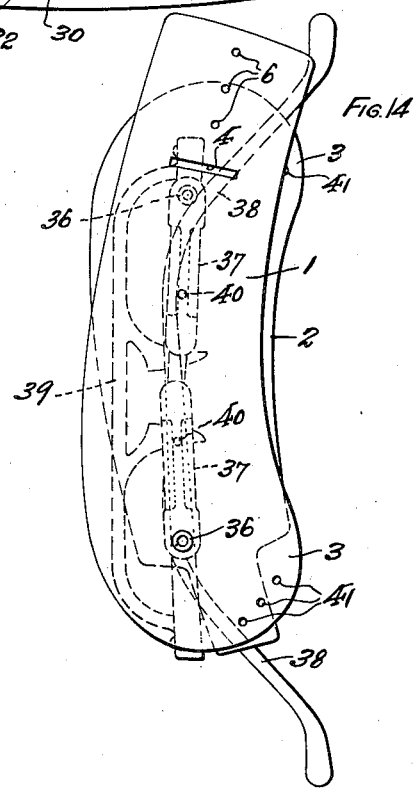
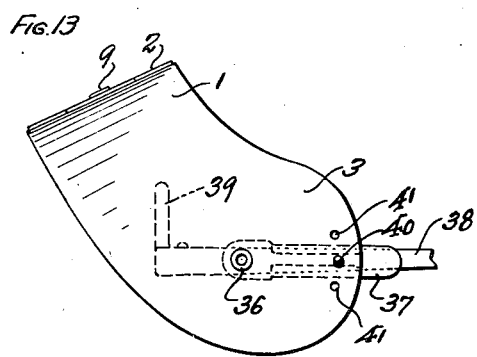
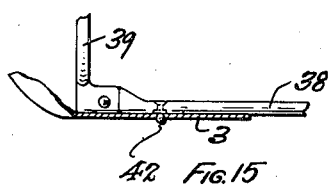
INVENTOR.
Samuel L. Wentz,
BY George D. Richards
ATTORNEY.

Patented Dec. 10, 1940

2,224,560

UNITED STATES PATENT OFFICE 2,224,560

EYESHADE MEANS

Samuel L. Wentz, Orange, N. J.

Application January 12, 1939, Serial No. 250,459

15 Claims. (Cl. 2—12)

This invention relates to improvements in eyeshades; and the invention has reference, more particularly, to improved eyeshade means adapted to be attachable to and supported by spectacle and similar frames.

The invention has for an object to provide eyeshade means of extremely light weight, of either fixed length or adjustable in length to accommodate the same in well-fitting relation to the width of the wearer's brow, of smart and neat appearance, and so constructed and arranged as to be quickly and easily detachably mounted upon spectacle and like frames in such manner that the same may be readily adjusted for desired angle of tilt and relative spaced relation to the brow of the wearer.

The invention has for another object to provide eyeshade means, characterized as above stated, having novel coupling means for attaching the same to the temple bows of a spectacle or like frame desired to support the same, said coupling means being selectively usable to attach the eyeshade means to either thin or thick temple bows, as the case may be.

The invention has for a further object to provide an eyeshade means comprising separable parts, whereby the same may be easily and quickly relatively disposed to be received with or without folded spectacle or other supporting frame within a spectacle or frame case so as to be carried therein with or without the spectacles or frame when not in use.

Other objects of this invention, not at this time more particularly enumerated, will be understood from the following detailed description of the same.

Illustrative embodiments of eyeshade structures made according to the principles of this invention are shown in the accompanying drawings, in which:

Fig. 1 is a perspective view of one form of the novel eyeshade structure of this invention mounted upon a spectacle frame worn by the user; Fig. 2 is a transverse vertical section, taken on line 2—2, but drawn on an enlarged scale; Fig. 3 is an inside or underside plan view of the eyeshade structure detached from the spectacle frame; Fig. 4 is a fragmentary cross sectional view, taken on line 4—4 in Fig. 3, but drawn on an enlarged scale; Fig. 5 is a fragmentary longitudinal section, taken on line 5—5 in Fig. 3, and also drawn on an enlarged scale; Fig. 6 is a fragmentary longitudinal section, taken on line 6—6 in Fig. 3; and Fig. 7 is a fragmentary inside plan view showing a modified form of the angularly adjustable selective coupling means with which the end portions of the eyeshade structure are equipped.

Figs. 8 and 9 are respectively inside plan views of eyeshade structures having modified forms of temple bow engaging coupling means.

Fig. 10 is a transverse vertical section, similar to that of Fig. 2, but showing additional modifications of the eyeshade structure, especially adapting the same for shielding the wearer's eyes against side and top glare; and Fig. 11 is an outside plan view of the eyeshade structure shown in Fig. 10 but with its body parts separated.

Figure 1:
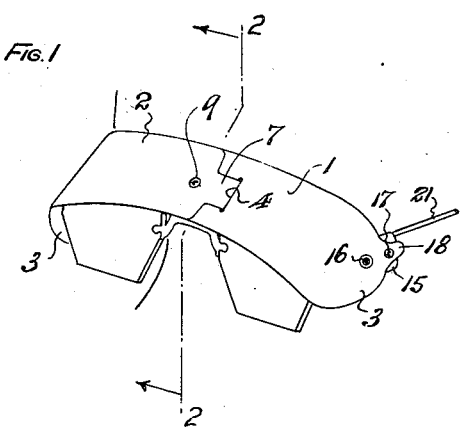

Fig. 12 is a top plan view of another form of the novel eyeshade structure operatively mounted on a spectacle, goggle or like frame, such e. g. as a lensless frame used merely as an eyeshade support; Fig. 13 is a side elevational view of the same; and Fig. 14 is a top plan view of the same with the body members of the eyeshade disconnected and folded relative to the folded frame ready for deposit within a carrying case.

Fig. 15 is a fragmentary horizontal section showing a modified arrangement of means for coupling the eyeshade structure to a spectacle or like frame.

Similar characters of reference are employed in the above described views, to indicate corresponding parts.

One embodiment of the novel eyeshade structure, as shown in Figs. 1 to 6 inclusive of the drawings, comprises two body sections 1 and 2 of suitable curvilinear periphery, terminating at their outer end portions in somewhat enlarged lobes 3. One of said body sections, as 1, is provided with a transverse slot 4 spaced inwardly from its inner extremity 5, and is further provided, intermediate said slot 4 and extremity 5 with a longitudinal row of spaced eyelet openings or perforations 6. The other said body section 2 is provided with an elongated tongue 7 extending from its inner extremity 8, and is further provided, at a suitable point adjacent to said extremity 8 with a snaphead 9 projecting perpendicular to the plane of its inner or under side. As thus constructed, the inner end portions of said body sections 1 and 2 may be adjustably joined together to provide an eyeshade member of variable length, whereby its length may be adjusted to nicely accommodate the same in well fitting relation to the wearer's brow and to a fitted spectacle frame worn by the wearer. The suitably adjusted coupled connection of the body sections 1 and 2 is accomplished by lapping the inner end portion of section 1 under the inner end portion of section 2 and inserting through slot 4 thereof the tongue 7 of the latter section, thereupon snapping the snaphead 9 of said latter section through a selected eyelet opening or perforation 6 of said section 1, thus interlocking said sections together in desired adjusted joined relation. Said body sections 1 and 2 are preferably made of sheet pyroxylin or like material having a requisite degree of flexibility, and the same are preferably opaque, although, if desired, the material may be merely darkly tinted so as to be either translucent or transparent.

While I have described above the eyeshade structure as provided in an adjustable form as to length, it will be understood that the same may be provided in a form which is non-adjustable as to length. For example, the eyeshade structure may comprise a single, suitably shaped integral body 10, as shown in Figs. 8 and 9, the same terminating at its respective outer end portions in the described somewhat enlarged lobes 3.

The end lobes 3 of the eyeshade body, whether comprising the adjustably joined sections 1 and 2 or the single integral body 10, are respectively provided with means for detachably coupling the same to the temple bows of a spectacle or other frame by which the eyeshade is to be supported when worn. Said coupling means may be provided in various forms. A simple form thereof, as shown, in Fig. 9, comprises a clip plate 11, made of sheet pyroxylin or similar material, pivotally mounted upon the under or inner side of each lobe 3, adjacent to the extremity thereof, by a pivoting eyelet or rivet means 12. Said clip plate 11 is provided, along a longitudinal margin thereof, with a springy laterally arched clip element 13, formed integrally with the body of said clip plate and doubled laterally thereupon to overhang the same; the free marginal portion of said clip element 13 terminating in an outwardly flared lip 14 divergent to the plane of said clip 11. To apply an eyeshade structure to a supporting frame, the clip elements 13 are sprung over and so as to engage around the respective temple bows of the frame, and, in order to determine the desired tilt angle of the eyeshade body, which arches between the temple bows above the frame and around the wearer's brow when thus coupled to said frame, the clip plates 11 and lobes 3 may be relatively angularly adjusted about the pivoting eyelet or rivet 12, being, in this case, held in adjusted position merely by frictional resistance to relative movement of these parts. In addition to such angular adjustment, the clip elements 13 may be slid forward or backward on the temple bows, thus adjusting the position of upper edge of the eyeshade body relative to the wearer's forehead, whereby the eyeshade may be spaced somewhat outwardly from the forehead so as to provide an intermediate ventilating space.

Figure 2:
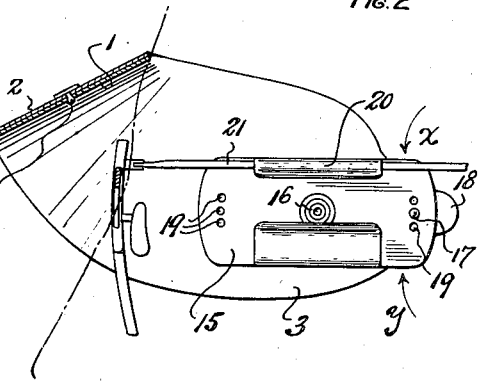
Figure 3:
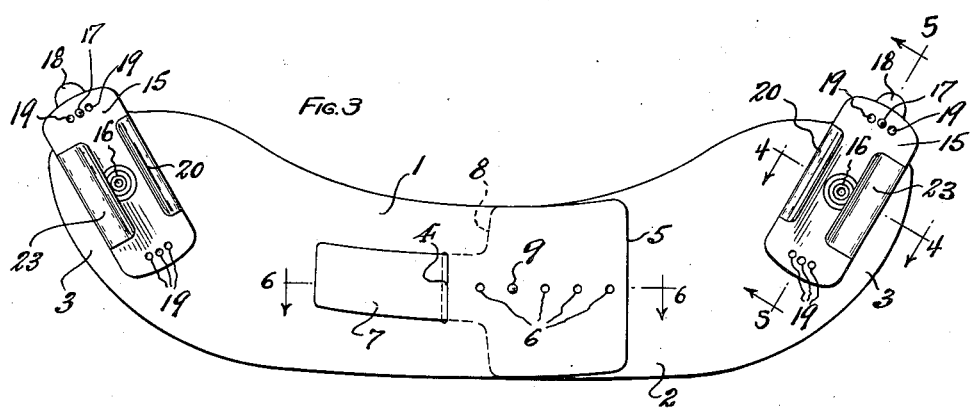
Figure 5:
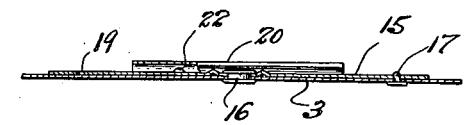
Figure 4:
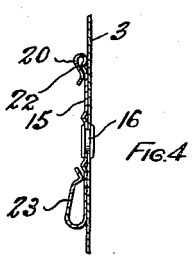

In Figs. 2, 3, and 4 a preferred form of coupling means is shown, the same comprising a reversible clip plate 15 mounted on the inner face of each lobe 3 by means of a pivoting eyelet or rivet 16. The lobes 3 are each provided with a projecting snaphead 17, preferably carried by an outwardly and substantially endwise extending flexible tab or tongue 18 with which each lobe 3 is provided. Adjacent its respective ends, the clip plate 15 is provided with a plurality of spaced eyelet openings or perforations 19 radial to the pivotal center of the clip plate 15 and thus forming an arcuate transverse row thereof. Formed in connection with one longitudinal margin of the clip plate 15 is a springy laterally arched clip element 20 which is formed integrally with the clip plate body and doubled over the same. This clip element 20 is so sized as to provide an internal bight of comparatively small cross-section, thus adapting the same to receive and engage over comparatively thin temple bows 21 of metallic spectacle or like frames. Since even metallic temple bows may vary somewhat in diameter, thickness or cross-sectional shape (e. g. some being of flat rectangular cross-section instead of round), it has been found of advantage to provide one or more small keeper bosses 22 which may be pressed out of the clip plate body to lie beneath the clip element 20, or vice versa, and below the internal bight thereof. When the clip element 20 is engaged over a round metallic temple bow, said keeper boss 22 will engage beneath the same and will tend to press the same up into the bight of the clip element. When the clip element 20 is engaged over a flat metallic temple bow, said keeper boss 22 will engage the lower marginal portion of the bow with tendency to urge its upper marginal portion upwardly into the bight of the clip element while at the same time thrusting the bow against the clip element so as to effect a strong tensional grip of the latter thereon. Formed in connection with the opposite longitudinal margin of the clip plate 15 is a springy laterally arched clip element 23 similar to that already described but so sized as to provide an internal bight of comparatively large cross section suitable to receive and engage over comparatively thick temple bows, such e. g. as those of zylonite and similar composition frames. It will be obvious that by turning the clip plates 15 about their pivoting eyelet or rivet 16 either clip element 20 or 23 may be positioned for service. At the same time the clip plates may be angularly adjusted in order to attain the desired tilt angle of the eyeshade body as supported by the frame upon which it is mounted; and when such angular adjustment is attained, the clip plates 15 may be securely locked against accidental displacement therefrom by snapping the snapheads 17 through a selected eyelet or perforation 19. It will be understood that the operations of engaging a clip element with a frame temple bow is facilitated by registering the clip element with the bow and pressing downwardly (i. e. in the direction of arrow $x$ in Fig. 2) upon an exposed edge of the clip plate 15. In a similar manner, the removal of the eyeshade from a frame is facilitated by pressing upwardly (i. e. in the direction of arrow $y$ in Fig. 2) upon an exposed edge of the clip plate 15; such operation releasing the clip elements so that the same snap off of the frame temple bows.

If desired, the clip plates 15 may be equipped with but a single clip element 24, as shown in Fig. 8, in which case the same may be angularly adjustable but need not be rotatively reversed end for end, as in the reversible construction previously described.

Figure 7:
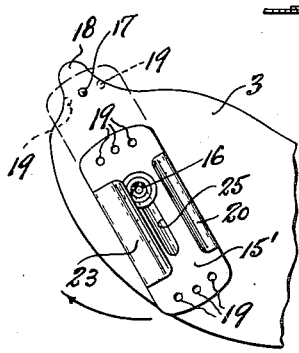

A somewhat modified form of reversible clip plate is shown in Fig. 7, wherein the clip plates 15' may be of reduced length, and yet of corresponding radial projection, with the pivotal connections thereof to the lobes 3 including a slot 25 to embrace the pivoting eyelet or rivet 16 so that the clip plate 15' may both turn and slide relative thereto. The end portions of the clip plates 15' are provided with the groups of openings or perforations 19 for selective cooperation with the snapheads 17. In reversing the clip plates 15' the same are released from engagement with the snapheads 17, and then retracted to the full line position shown in Fig. 7, and thereafter turned to the dotted line position shown in Fig. 7 which both brings the desired clip element into service position and at the same time positions the group of openings or perforations at the then projected end into position for selective engagement with the snapheads 17, whereby the thus reversed clip plates may be secured in desired angular adjustment for supporting the eyeshade at a desired angle of tilt when attached to and supported upon a spectacle or other frame with which the eyeshade is to be worn.

In Figs. 10 and 11 there is shown an eyeshade structure which is designed to provide more protection against side and top glare or light rays of lateral incidence relative to the eyes of the wearer. This form of eyeshade structure comprises two body sections 26 and 27 equipped at its end lobes 28 with any of the described clip means for coupling the same to temple bows 21 of a spectacle or other frame. One section, as 26 is provided, adjacent to its inner end with a medial row of longitudinally spaced openings or perforations 29. The other section, 27, is provided, adjacent to its inner end with a snaphead 30 selectively engaged in one of a correspondingly spaced longitudinal row of perforations 29'. Said snaphead 30 is cooperative with a selected opening or perforation 29 to join said sections together in longitudinally adjusted relation and in central position intermediate the shade body ends. Affixed to the section 27, preferably by the base 31 of the snaphead 30, is the butt piece 32 of a hook element 33, the loop of which extends upwardly and over the top margin of section 27 to dispose said hook element 33 in central overhanging relation to the top marginal portion of the eyeshade body formed by the joined sections 26—27. In this form of eye-shade, the inner end portions of the sections 26—27 are comparatively narrow and the lobes 28 are relatively wider and longer. The lobes 28 are respectively coupled with the temple bows 34 of the supporting frame so as to lie in a rearwardly extended plane parallel thereto and substantially at right angles to the plane of the wearer's eyes, and the medial portion of the eyeshade is coupled to the bridge 35 of the supporting frame, so as to dispose the same in a relatively horizontal plane above the wearer's eyes (see Fig. 10). By reason of this method of mounting the eyeshade on the supporting frame, a maximum of shielding effect against lateral glare or side entering light rays is attained.

In Figs. 12 to 14 inclusive, there is shown another somewhat modified form of the novel eyeshade structure; the same comprising a pair of body sections 1 and 2 having the lobes 3 at their outer ends, and the tongue 7 and slot 4 connection in combination with the snaphead 9 and cooperating opening 6 for joining said sections in longitudinally adjusted connection. Pivotally mounted on the inside faces of the lobes 3 by means of a pivoting eyelet or rivet 36 are laterally bifurcate coupling slips 37 to embracingly engage the temple bows 38 of a suitable supporting frame 39, preferably of the lensless type. Each clip 37 carries a snaphead 40 selectively engageable in one of a plurality of eyelets or openings 41 with which the lobes 3 are provided, whereby said clips may be angularly adjusted for the purposes already above referred to. The form and arrangement of the coupling clips 37 is such, that when the body sections 1 and 2 are disengaged one from the other, and the clips themselves released by disengaging their snapheads 40 from an eyelet or opening 41, the body sections may be revolved around the pivoting eyelets or rivets 36 respectively to positions substantially parallel to the temple bows 38 of the frame 39, and thereupon folded with said bows relative to the frame, without detaching the body sections from the temple bows, to a collapsed position such as shown in Fig. 14. The eyeshade thus collapsed and folded with the frame may be deposited within a carrying case when not in use.

In Fig. 15 a further modification of the eyeshade is shown, wherein the temple bows 38 of the supporting frame 39 are optionally provided with snapheads 42 or other coupling means for pivotally engaging the eyeshade sections in either permanently attached or in detachable relation thereto, the same projecting laterally from the outer sides thereof. When this construction is provided, the coupling clip elements of the eyeshade structure may be omitted, and the lobes 3 merely provided with rows of transversely spaced eyelets or openings 41 selectively engageable with the snapheads 42, whereby the eyeshade structure may be adjustably coupled in operative relation to the carrying frame.

I am aware that many changes may be made in the general arrangement and combinations of the devices and parts, as well as in the details of the construction of the same, without departing from the scope of my invention as defined by the appended claims. Hence, I do not limit my invention to the exact arrangements and combinations of the devices and parts as set forth in the foregoing specification, nor do I confine myself to the exact details of the construction of said parts as illustrated in the accompanying drawings.

I claim:

1. An eyeshade structure having angularly adjustable coupling clip means pivotally attached to its outer end portions and adapted to detachably embracingly engage the temple bows of a supporting frame to mount said eyeshade structure thereon for extension above and from side to side of said frame at a selected tilt angle.

2. An eyeshade structure having angularly adjustable coupling clip means pivotally attached to its outer end portions and adapted to detachably embracingly engage the temple bows of a supporting frame to mount said eyeshade structure thereon for extension above and from side to side of said frame at a selected tilt angle, and means to lock said coupling clip means in selected angularly adjusted positions.

3. An eyeshade structure having angularly adjustable coupling clip means pivotally attached to its outer end portions and adapted to detachably embracingly engage the temple bows of a supporting frame to mount said eyeshade structure thereon for extension above and from side to side of said frame at a selected tilt angle, and means to lock said coupling clip means in selected angularly adjusted positions, said latter means comprising snapheads and transversely spaced perforations cooperative between said coupling clip means and the end portions of said eyeshade structure.

4. An eyeshade structure having reversible and angularly adjustable clip plates pivotally attached to its outer end portions, said clip plates having coupling clips along their respective longitudinal margins of different sizes selectively disposable for use by turning said clip plate end for end about its pivot point, said coupling clips being adapted to detachably embracingly engage comparatively thin or thick temple bows respectively of a supporting frame to mount said eyeshade structure thereon for extension above and from side to side of said frame at a selected tilt angle, and means to lock said clip plates in selected angularly adjusted positions.

5. An eyeshade structure having reversible and angularly adjustable clip plates pivotally attached to its outer end portions, said clip plates having coupling clips along their respective longitudinal margins of different sizes selectively disposable for use by turning said clip plate end for end about its pivot point, said coupling clips being adapted to detachably embracingly engage comparatively thin or thick temple bows respectively of a supporting frame to mount said eyeshade structure thereon for extension above and from side to side of said frame at a selected tilt angle, and means to lock said clip plates in selected angularly adjusted positions, said latter means comprising snapheads and transversely spaced perforations cooperative between said clip plates and the end portions of said eyeshade structure.

6. In an eyeshade structure, a pair of body sections and means to adjustably join the inner end portions of said body sections for selectively varying the longitudinal dimension of the structure, said latter means comprising cooperative slot and tongue means at said inner end portions of said body sections, and selective releasable cooperating means carried thereby for positively securing said sections in a selected adjusted relation.

7. In an eyeshade structure, a pair of body sections and means to adjustably join the inner end portions of said body sections for selectively varying the longitudinal dimension of the structure, said latter means comprising cooperative slot and tongue means at said inner end portions of said body sections, and a snaphead and longitudinally spaced perforations cooperative between said latter portions for securing said sections in a selected adjusted relation.

8. An eyeshade structure comprising, a pair of body sections, means to adjustably join the inner end portions of said body sections for selectively varying the longitudinal dimension of the structure including selective releasable cooperating means carried by said inner end portions of the body sections for positively securing the same in selected adjusted relation, and angularly adjustable coupling clip means pivotally attached to the outer end portions of said body sections and adapted to embracingly engage the temple bows of a supporting frame to mount said eyeshade structure thereon for extension above and from side to side of said frame at a selected tilt angle.

9. An eyeshade structure comprising, a pair of body sections, means to adjustably join the inner portions of said body sections for selectively varying the longitudinal dimension of the structure including selective releasable cooperating means carried by said inner end portions of the body sections for positively securing the same in selected adjusted relation, and angularly adjustable coupling clip means pivotally attached to the outer end portions of said body sections and adapted to embracingly engage the temple bows of a supporting frame to mount said eyeshade structure thereon for extension above and from side to side of said frame at a selected tilt angle, and means to lock said coupling clip means in selected angularly adjusted positions.

10. An eyeshade structure comprising, a pair of body sections, means to adjustably join the inner end portions of said body sections for selectively varying the longitudinal dimension of the structure including selective cooperating means carried by said inner end portions of the body sections for positively but releasably securing the same in selected adjusted relation, and angularly adjustable coupling clip means pivotally attached to the outer end portions of said body sections and adapted to embracingly engage the temple bows of a supporting frame to mount said eyeshade structure thereon for extension above and from side to side of said frame at a selected tilt angle and means to lock said coupling clip means in selected angularly adjusted positions, said latter means comprising snapheads and transversely spaced perforations cooperative between said coupling clip means and the outer end portions of said body sections.

11. An eyeshade structure comprising, a pair of body sections, means to adjustably join the inner end portions of said body sections for selectively varying the longitudinal dimension of the structure, and angularly adjustable coupling clip means pivotally attached to the outer end portions of said body sections and adapted to embracingly engage the temple bows of a supporting frame to mount said eyeshade structure thereon for extension above and from side to side of said frame at a selected tilt angle, means to lock said coupling clip means in selected angularly adjusted positions, said latter means comprising snapheads and transversely spaced perforations cooperative between said coupling clip means and the outer end portions of said body sections, and a hook element at the joined inner ends of said body sections engageable with the nose bridge of said supporting frame.

12. An eyeshade structure comprising, a pair of body sections, angularly adjustable coupling clip means pivotally attached to the outer end portions of said body sections and adapted to embracingly engage the temple bows of supporting frame, and a hook element at the joined inner ends of said body section engageable with the nose bridge of said supporting frame.

13. An eyeshade structure comprising, a pair of body sections, angularly adjustable coupling clip means pivotally attached to the outer end portions of said body sections and adapted to embracingly engage the temple bows of supporting frame, and a hook element at the joined inner ends of said body section engageable with the nose bridge of said supporting frame, and means to adjustably join the inner ends of said body section operative to also centralize said hook element relative to the body section ends.

14. An eyeshade structure having angularly adjustable holding means pivotally attached to its outer end portions for coupling said end portions to the temple bows of a supporting frame by which the eyeshade structure is to be carried, each holding means having marginal overlapping clip means to snap over a supporting frame temple bow, and a temple bow retaining boss means within said clip means and spaced below the bight thereof.

15. In an eyeshade structure, a pair of body sections having overlapping inner end portions, selective means comprising spaced perforations and coupling means engageable therewith respectively carried by said inner end portions of the body sections for positively but releasably securing the same in selected adjusted relation, and means cooperative with said securing means adapted to prevent direct transmission of unshielded light through the perforations thereof.

SAMUEL L. WENTZ.